(No Model.)
C. P. LESHER.
AGRICULTURAL IMPLEMENT.
No. 564,432. Patented July 21, 1896.
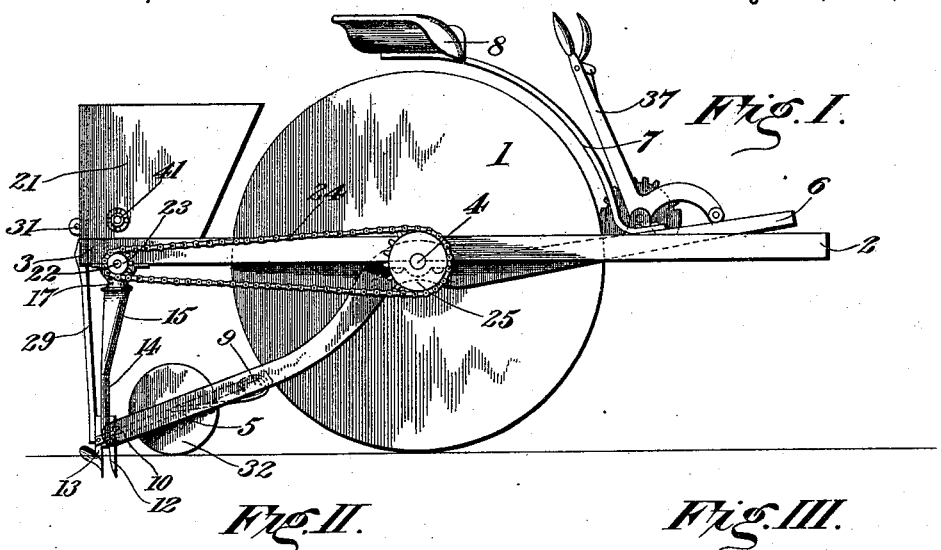
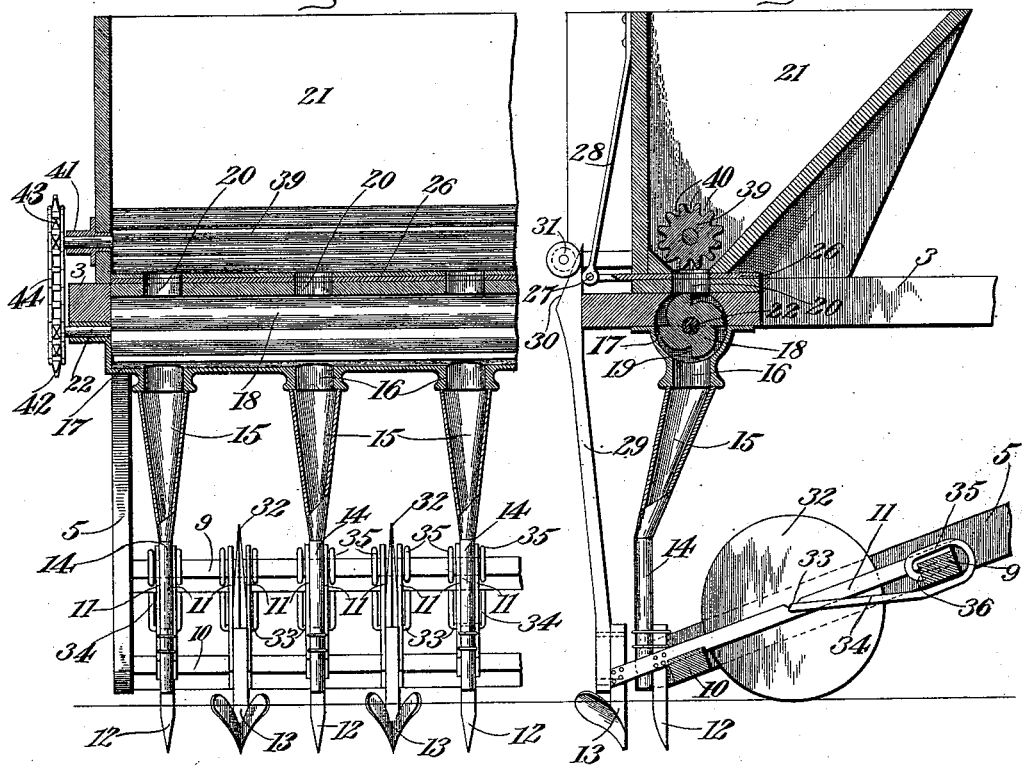
Witnesses
M. C. Fowler
S. M. Acker
Inventor
Charles P. Lesher
By Joseph L. Atkins
Attorney

UNITED STATES PATENT OFFICE.

CHARLES P. LESHER, OF LANSING, MICHIGAN.

AGRICULTURAL IMPLEMENT.

SPECIFICATION forming part of Letters Patent No. 564,432, dated July 21, 1896.

Application filed April 14, 1896. Serial No. 587,451. (No model.)

*To all whom it may concern:*

Be it known that I, CHARLES P. LESHER, of Lansing, county of Ingham, State of Michigan, have invented certain new and useful Improvements in Agricultural Implements, of which the following is a specification, reference being had to the accompanying drawings.

The object of my invention is to produce an agricultural implement combining the features of a roller, harrow, and grain-drill, whereby the cost of the machine is materially diminished and its general efficiency and adaptability increased.
In the accompanying drawings, Figure I is a side elevation of my implement. Fig. II is a rear elevation thereof with the rear wall of the feed-box removed. Fig. III is a longitudinal vertical section of the machine as shown in Fig. I.

Referring to the figures on the drawings, 1 indicates an ordinary roller, 2 the forward end of frame-pieces, and 3 the rear ends thereof, within which are revolubly mounted the trunnions 4 of the roller 1.

5 indicates the downwardly-deflected end, and 6 the upwardly-deflected end, of a swinging frame, also carried upon the trunnions 4. The ends 6 of the swinging frame carry the seat-support 7 and seat 8, while the depending ends 5 of the swinging frame carry between them an upper bar 9 and a lower bar 10. Upon these bars are secured at regular intervals a series of harrow-teeth arms 11, which consist, preferably, of metallic plates secured a suitable distance apart, and each pair carries upon its ends a suitably-secured harrow-tooth 12 or colter-blade 13. The arms 11 are of different lengths, and a long and a short arm are arranged in alternate order upon the bars 9 and 10. The long arms carry colter-teeth 13 and the short arms the harrow-teeth 12.

With each of the harrow-teeth is connected a seeder-chute 14, which connects, as by a conduit 15, with a seed-discharge orifice 16 of a trough 17, within which turns a seed-discharge roller 18. This roller is provided with longitudinal grooves or clefts 19, which receive grain through the discharge-outlets 20 of a grain-hopper 21 and, revolving, deposits the grain into the respective conduits 15.

The shaft 22 of the roller carries upon its extremity a sprocket-wheel 23, through which, by means of a sprocket-band 24, motion is imparted from the sprocket-wheel 25, that is secured to the extremity of one of the trunnions 4. Each of the openings 20 is controlled by a cut-off slide 26, and the same slide may be employed for all of the openings 20. The slide is pivoted, as indicated at 27, to a spring 28, one end of which is secured to the hopper and which tends to keep the slide in the open position.

29 indicates a slide-operating bar which is attached to one of the harrows of colter-standards 12 13, and whose beveled end 30 moves between the spring 28 and a roller 31. Consequently, when the arms 11 are raised, as by the upward movement of the frame-pieces 5, the beveled end 30 presses against the roller 31 and closes the slide, shutting off the grain-feed.

Each pair of the arms 11 carries between its plates a cutting disk or wheel 32, which is independently supported, as on an axis 33, by spring-arms 34, whose ends are coiled, as indicated at 35, around the bar 9, to which, as indicated at 36, the extremity of each spring-arm is fastened. By this arrangement a series of yieldingly-supported cutting-disks is provided, in which each of the disks may be actuated independently by an obstruction, all of which may be lifted through the lifting of the arms 11, as by the side frame-pieces 5 and the bars 9 and 10, which unite them.

37 indicates a hand-lever within reach of the seat 8, by which the swinging frame, composed of the pieces 5 and 6, may be elevated or depressed so as to lift the harrow from the ground when not in use, and at the same time, through the elevation of the part 29, in the manner previously described, to shut off the seed-feed. Mechanism for this purpose being well known in the art, it is not illustrated in detail.

Above the roller 18 I prefer to provide a feed-roller 39, which is furnished with a number of longitudinal corrugations 40. The roller 39 is located above the roller 18 in bearings 41, and is driven, as by sprockets 42 and 43, secured, respectively, to the ends of the rollers 18 and 39 and connected together, as by a sprocket-band 44.

What I claim is—

1. In an agricultural implement, the combination with a roller, its trunnions, and frame, of a swinging frame pendent on the trunnions, a feed-hopper carried on the main frame, and feeding mechanism operatively connected with the main frame and the pendent frame, substantially as set forth.

2. In an agricultural implement, the combination with a roller, its trunnions, and frame, of a pendent frame carried upon the trunnions, a series of teeth carried upon the pendent frame, and means for operating the pendent frame, substantially in the manner and for the purpose specified.

3. In an agricultural implement, the combination with a roller, its trunnions, and frame, of a swinging frame pendent on the trunnions, a series of arms composed of plates arranged in pairs upon the pendent frame, and disk cutters carried upon the frame between the plates, but independent of them, substantially as set forth.

4. In an agricultural implement, the combination with a roller its trunnions and frame, of a swinging frame pendent upon the trunnions, a series of arms composed of plates arranged in pairs upon the frame, and disk cutters each spring supported between the plates, but independently thereof, substantially as set forth.

5. In an agricultural implement, the combination with a roller, its trunnions and frame, of a swinging frame pendent upon the trunnions, bars constituting a part of the pendent frame, a series of arms composed of plates arranged in pairs upon the bars, a spring coiled around the upper bar for each pair of plates, and carrying between the plates a disk cutter, substantially as set forth.

6. In an agricultural implement, the combination of a frame and roller revolubly secured therein, of a feed-hopper and feeding mechanism operatively connected with the roller, a series of harrow or similar teeth carried on the frame and adapted to be raised and lowered independently thereof, a spring-actuated cut-off slide in the hopper, and a beveled slide-actuating piece carried upon one of the teeth and adapted to operate the slide by the raising and lowering of the tooth which carries it, substantially as set forth.

In testimony of all which I have hereunto subscribed my name.

CHARLES P. LESHER.

Witnesses:
LEONARD BANGHART,
J. W. TILLOTSON.